(12) United States Patent
Walters

(10) Patent No.: US 7,188,471 B2
(45) Date of Patent: Mar. 13, 2007

(54) SUBMERSIBLE POWER PLANT

(76) Inventor: William Don Walters, 2230 Biscay Ct., Byron, CA (US) 94514

( * ) Notice: Subject to any disclaimer, the term of this patent is extended or adjusted under 35 U.S.C. 154(b) by 174 days.

(21) Appl. No.: 10/840,906

(22) Filed: May 7, 2004

(65) Prior Publication Data

US 2005/0271501 A1 Dec. 8, 2005

(51) Int. Cl.
*F04B 35/02* (2006.01)
*F03B 13/12* (2006.01)

(52) U.S. Cl. .................. 60/398; 417/331; 290/53

(58) Field of Classification Search ............. 60/398; 417/331, 333; 290/42, 43, 53, 54
See application file for complete search history.

(56) References Cited

U.S. PATENT DOCUMENTS

| | | | |
|---|---|---|---|
| 3,303,649 A | 2/1967 | Mastini | |
| 3,487,228 A | 12/1969 | Kriegel | |
| 3,504,648 A | 4/1970 | Kriedt | |
| 3,970,415 A | 7/1976 | Widecrantz et al. | |
| 3,991,563 A * | 11/1976 | Pelin | 60/398 |
| 3,994,134 A | 11/1976 | Molnar | |
| 4,091,618 A | 5/1978 | Jackson | |
| 4,092,828 A * | 6/1978 | Garza | 60/398 |
| 4,095,421 A | 6/1978 | Silcox | |
| 4,619,593 A | 10/1986 | Molnar | |
| 6,711,985 B1 * | 3/2004 | Doyle | 92/165 R |

* cited by examiner

*Primary Examiner*—Michael Leslie
(74) *Attorney, Agent, or Firm*—Brian Beverly; Beeson Skinner Beverly, LLP

(57) ABSTRACT

A submersible power plant 10 comprises a submersible enclosure 12 having at least one intake valve 16 for admitting water at high pressure from the surrounding sea into and air space in the enclosure. An air shaft from the air space 96 is in communication with the atmosphere for maintaining the air space at approximately one atmosphere. A pump for evacuating water collected in the enclosure includes a buoy 62 responsive to ocean swells. A piston shaft 58 connected to the buoy reciprocates in the center bore 60 of a vertical column 52 extending upward from the bottom of the enclosure. As the piston shaft rises inflow valves 72 admit water in the enclosure into a valve housing 70 in communication with the center bore. As the piston shaft falls water is discharged from the valve housing into the sea through a discharge valve 80 in the bottom of the enclosure.

30 Claims, 4 Drawing Sheets

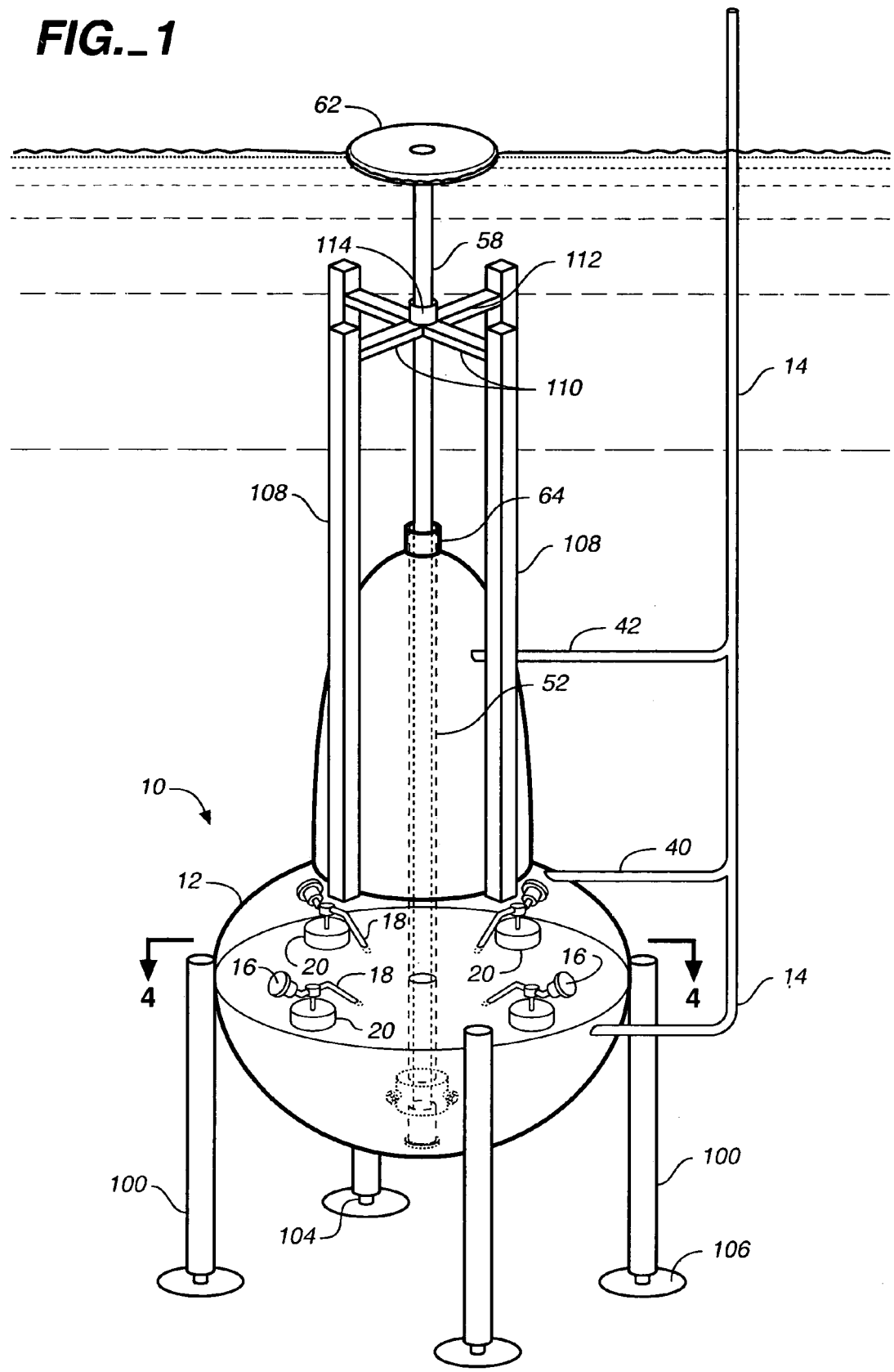
FIG._1

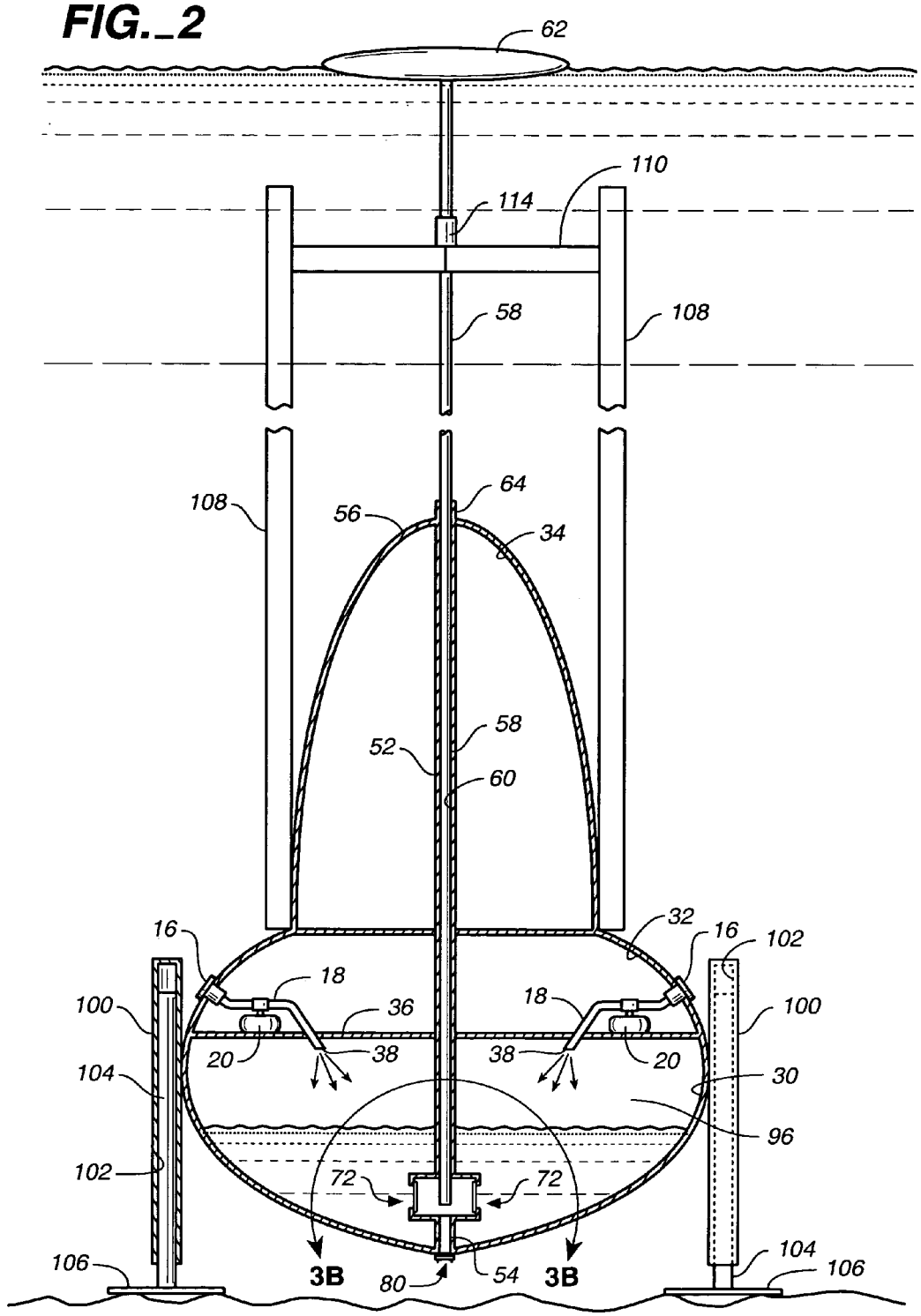

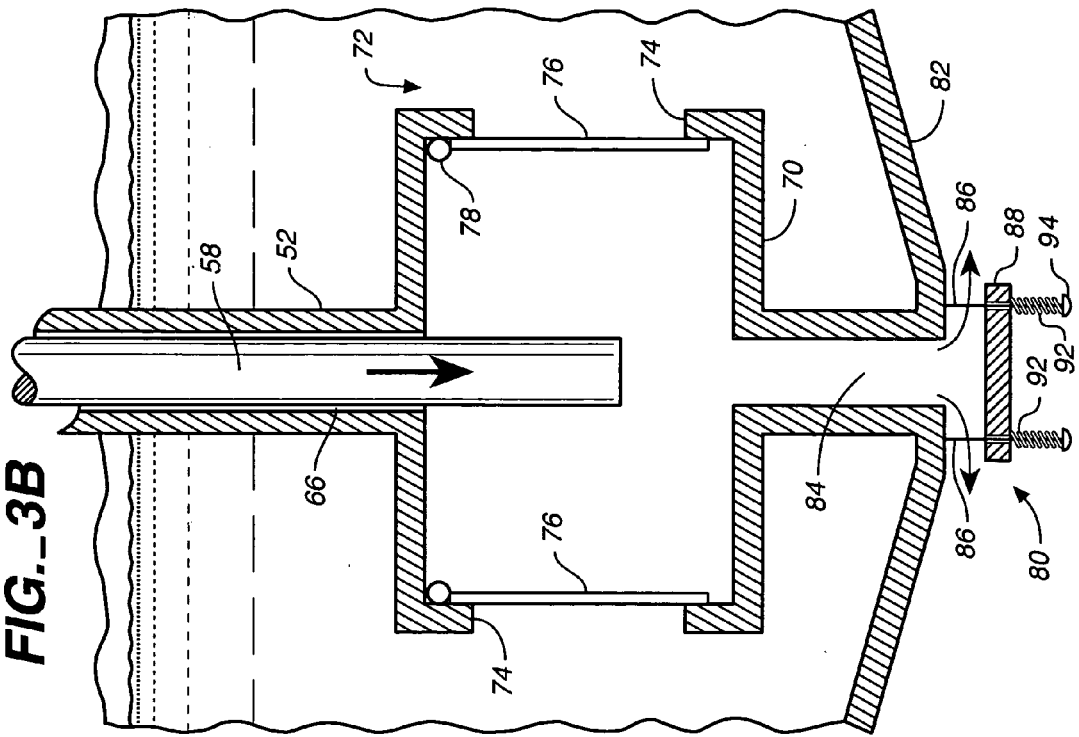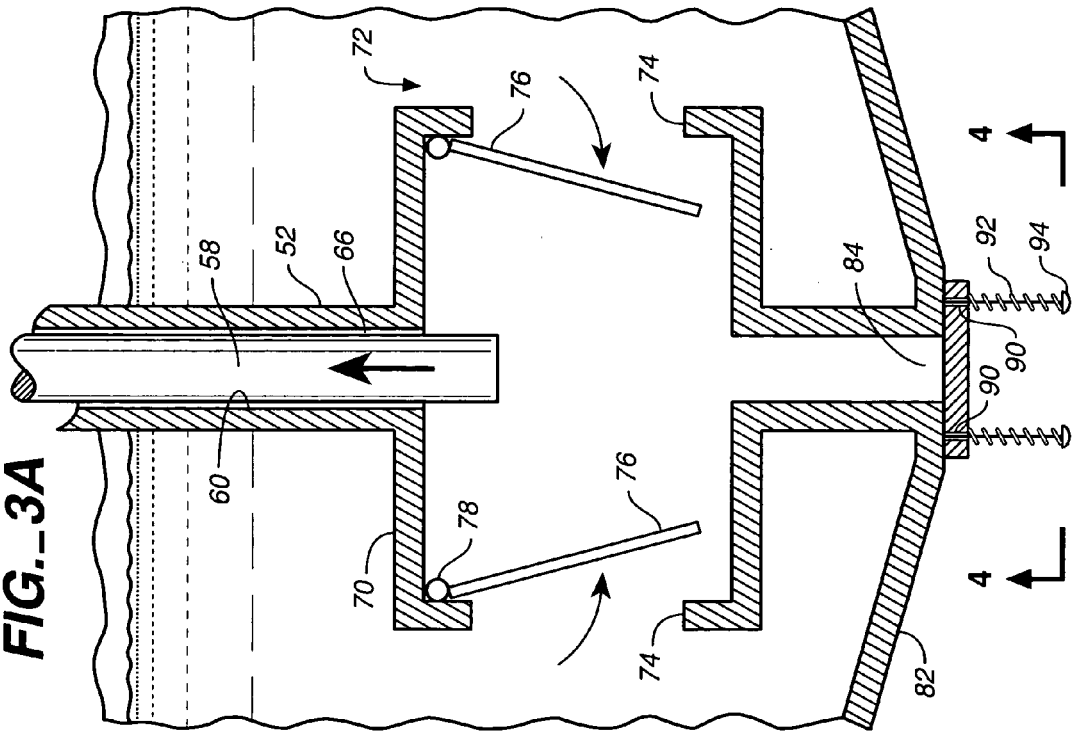

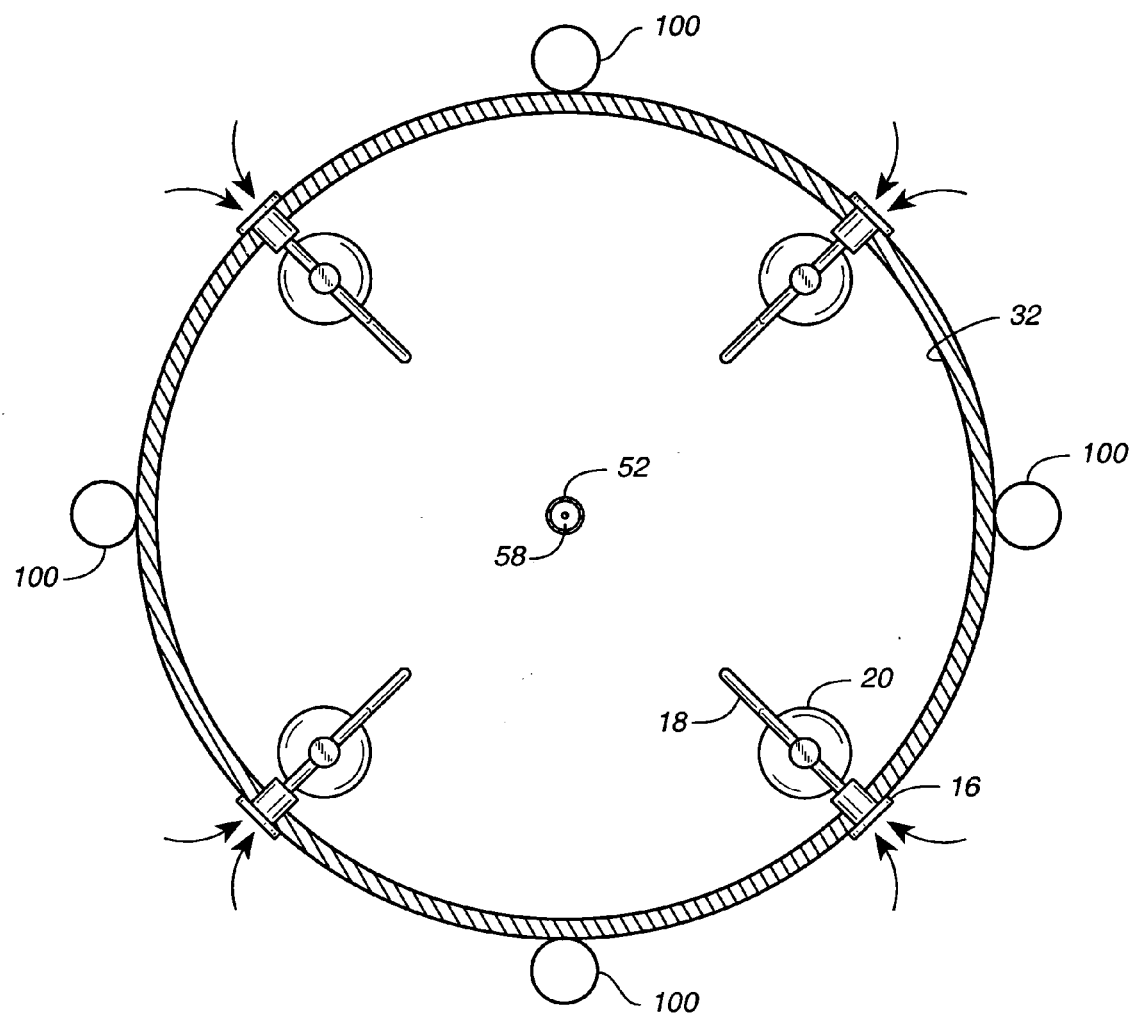
FIG._4

SUBMERSIBLE POWER PLANT

BACKGROUND OF THE INVENTION

1. Field of the Invention

This invention relates generally to power plants which derive power from the immense pressure of water in the ocean's depths and, more particularly, to submersible power plants having a pump activated by ocean swells to evacuate water from the submersed power plant.

2. Description of the Related Art

The development of renewable energy resources has taken on increased importance as the supply of fossil fuels grows ever closer to being exhausted. Given the increasing evidence of the harmful effects on the environment attendant to consumption of conventional fuels, it is imperative that newly developed sources of energy be clean and reliable.

A great deal of salutary and creative effort has been directed to harnessing the powers of nature. These efforts, such as solar power, hold promise but today still leave us largely dependent on foreign oil. One force of nature that remains untapped is the energy trapped in the earth's oceans where deep sea water is subject to immense pressures. It is generally understood that an enclosure may be submerged in the sea and that water flowing into the enclosure at high pressure may be used to power a turbine for generation of electricity. The problem of how to remove the water from the enclosure has been addressed with attempted solutions having varying levels of complexity and practicality.

In U.S. Pat. No. 3,994,134 to Molnar, an apparatus for power generation in deep seawater is disclosed in a first cycle of which water filling a submerged receptacle chamber passes through a rotating power generator. In a second cycle an electric motor moves receptacle and plunger casings simultaneously downward on angularly positioned border plates with the result that a plunger is pushed into the receptacle chamber to force out water from the chamber. In a third cycle the receptacle and plunger casings are simultaneously moved upwards on the border plates, assisted by a counterweight suspended on a cable, to pull the plunger out of the chamber. Compressed gas is pumped into the chamber during the upward movement to avoid creating a vacuum in the chamber. The complexity of the Molnar apparatus would make it impracticable to employ in a deep sea environment. Another disadvantage is that the Molnar apparatus pumps intermittently, as the receptacle moves through the downward and upward cycles, greatly reducing its efficiency. Finally, supplemental sources of energy such as compressed gas and electric motors to assist the component parts of the device in moving through its cycles are needed which diminishes the overall energy efficiency of the device.

U.S. Pat. No. 4,091,618 to Jackson discloses an ocean motion power generating system in which a container is positioned beneath the surface of a body of water. A hydrostatic head caused by the pressure differential between water surrounding the container and a void inside the container causes water to flow into the container through an inlet pipe and then through a turbine which drives a generator. The void is created by pumping water out of the container. The pump involves a floating buoy, the action of wave motion on which causes the buoy to rise and fall. A piston is joined to the buoy by a depending cable so that, when the buoy moves upward, the piston is pulled upward in a cylinder. As the piston is pulled up a number of check valves in the form of individual vanes open to allow water from the container to flow into the cylinder. As the piston falls downward, apparently due to the force of gravity, the vanes close to prevent water from flowing back into the container, and like check valves in the piston head open to allow water in the cylinder to pass into the ocean. The vanes in the piston head close when the piston is pulled up, preventing water from the ocean to enter the cylinder. In an alternate embodiment of Jackson, the buoy is deployed in the shape of a cylindrical collar around a leg of an ocean platform. The Jackson apparatus has a number of disadvantages. First, it is unclear how a void could ever be created given the device as disclosed because, as the piston draws water out of the container, replacement water is drawn in through the inlet pipe. Regardless of whether a true void is created in Jackson., the pressure in the container will fluctuate continuously according to the siphoning power acting on the container as a result of the upward movement of the piston leading to uneven pumping action. Second, the amount of power necessary to efficiently evacuate water from the container becomes increasingly tremendous as the container is submerged further in the ocean. The power stroke of the piston in Jackson is on upward movement so that the piston is pulling, not only against the pressure of the ocean versus the lower pressure of the interior of the container, but against the force of gravity. Were container to descend further in the ocean, a depth would be reached at which point it would become impossible for the piston, driven by the rising buoy, to remove water from the container. Third, in an ocean setting, especially at substantial depths, mechanical wear and tear and part failure is a very serious concern. The multiple vanes which comprise the check valves in the piston and between the container and the cylinder in Jackson would appear to be prone to failure in such a deep sea environment. Fourth, use of a cable to suspend the piston from the buoy permits substantial lateral movement and, even in the ocean platform-based embodiment, introduces the potential for flexure of the cable leading to the possibility of the cable becoming tangled, dropping or the cable failing under high recovery stresses. Fifth, cables are subject to deterioration over time and require maintenance or replacement. Finally, the pump in Jackson acts intermittently such that the hydrostatic head will increase or decrease according to the upward and downward movements of the piston, with resulting decreased efficiency.

U.S. Pat. No. 4,619,593, also to Molnar, discloses a tank which is submerged in deep sea water such that the pressure within the tank is less than that of the pressure of water in the surrounding sea. Water flowing from the sea into the tank actuates a turbine for producing work. A fluid extraction device uses a reciprocating extractor pocket to move water from within the tank to the sea outside. The fluid extractor requires a motor to move it back and forth and uses three sets of valves to admit water from the tank into the extractor pocket, move the extractor pocket outside of the tank, and release the water into the sea.

The state of the art leaves an unmet need for an deep sea power generating apparatus that is efficient, relies to the smallest extent possible on external power sources, is simple, produces continuous, rather than intermittent, power, and is durable in an ocean deep water setting.

SUMMARY OF THE INVENTION

A submersible power plant according to the invention is directed to a submersible enclosure capable of being submersed in a deep sea environment at a depth at which the water is under a selected high pressure. Since sea water pressure increases a known amount for every foot of depth, it is a relatively straightforward matter to select a depth for the device according to the water pressure with which it is desired to surround the enclosure. The entire device, as described in greater detail below, will have a known weight and buoyancy. By employing technology well known to those skilled in the art, the enclosure may be submerged to and held at a desired depth, e.g., using ballast. An air shaft extends from the enclosure upward to the atmosphere so that the pressure of the air space in the enclosure is maintained at approximately one atmosphere regardless of the depth at which the enclosure is submerged. At least one intake valve admitting water at high pressure from the surrounding sea into the enclosure powers a turbine or turbines in the enclosure to produce electricity.

A pump for evacuating water collected in the enclosure includes a vertical column affixed to the bottom of the enclosure. The column extends upward through the top of the enclosure and has a center bore extending to a top opening in the column. A piston shaft disposed in the center bore is attached at its upper end to a buoy floating at the surface. The piston shaft has an outer diameter slightly smaller than the inner diameter of the center bore such that the piston shaft substantially occupies the horizontal dimension of the center bore but moves freely vertically. Thus, as the buoy experiences vertical movement in response to surface swells in the ocean, the piston shaft rises and falls in a continuous reciprocating motion in the center bore. The buoy is of a sufficiently large size that it responds to ocean swells rather than wave action. Ocean swells are known to occur throughout the world's oceans at sufficiently regular intervals that the rise and fall of the piston shaft can be predicted with substantial accuracy. The buoy is provided with a pronounced horizontal elongation such that it "cuts through" wave action but responds to sea swells.

Adjacent the bottom of the enclosure inflow valves are provided to allow water collecting in the enclosure to flow into the center bore of the cylinder below the bottom of the piston shaft. The inflow valves act as check valves to prevent backflow of water from the cylinder's center bore into the enclosure. Accordingly, as the piston shaft rises water is pulled from the enclosure into the center bore, which acts as a pump chamber. A discharge valve is provided in the bottom of the enclosure in communication with the center bore. The discharge valve also acts as a check valve, but is directionally the reverse from the inflow valve or valves to allow water to be forced through it out of the enclosure, and to prevent water from outside the enclosure from back flowing into the center bore of the cylinder. Hence, as the piston shaft descends water trapped in the center bore is forced out through the discharge valve. The intake valves, buoy, piston shaft, bore, and discharge valve together act as a pump, powered by ocean swells, to evacuate water from the enclosure. The pumping rate of the evacuation pump is calibrated, given the known frequency of sea swells, to evacuate at least as much water from the enclosure as that entering the enclosure through the intake valve or valves. This allows an air space to be maintained in an upper part of the enclosure which, because it is in direct communication with the atmosphere, is always held at approximately one atmosphere pressure.

There are several evident advantages to the submersible power plant according to the invention. By being able to hold the pressure in the enclosure at approximately one atmosphere, water can be continuously admitted without interruption and at a steady rate into the enclosure through the intake valve or valves. As a result the turbines associated with the intake valve or valves operate continuously with increased efficiency over the prior art.

The construction of the invention is simple, albeit large. The construction design is intended to be durable and to perform for long periods of time under the rigorous conditions found in deep sea settings. To most effectively address the extreme pressures of the ocean's deep, the outside geometry of the device approaches, as nearly as possible, the shape of a sphere and has very few moving parts exposed to the ocean. Similarly, the inflow and discharge valves are of simple construction with as few moving parts as possible in order to reduce the potential for failure.

The invention weds two independent systems: one for admitting water into the enclosure for operating turbines to produce power; the other for evacuating collected water from the enclosure. The former relies on the intense pressures existing in the deep sea. The latter relies on regular ocean swell activity. Therefore, the device, once installed, uses two different and independent forces of nature in calibrated cooperation to produce clean, essentially free power.

BRIEF DESCRIPTION OF THE ILLUSTRATIONS

FIG. 1 is a perspective view of a submersible power plant according to the invention.

FIG. 2 is an elevation sectional view of the submersible power plant shown in FIG. 1 showing the intake valves, conduits and turbines aligned horizontally with the external supports in a slightly different orientation than shown in FIG. 1 for the sake of clarity.

FIGS. 3A and 3B are close-up sectional views of the bottom of the enclosure taken along line 3B—3B showing the cylinder, piston shaft, intake valves, and discharge valve of the invention; FIG. 3A showing upward movement of the piston shaft and inflow of water into the central bore; and FIG. 3B showing downward movement of the piston shaft and water being forced out of the discharge valve.

FIG. 4 is a sectional plan view of the secondary chamber of the enclosure of the submersible power plant shown in FIG. 1 taken along lines 4—4.

DETAILED DESCRIPTION OF THE ILLUSTRATED EMBODIMENT

A submersible power plant 10 according to the invention is shown in FIG. 1 and comprises a submersible enclosure 12 constructed for extended submersion in a high pressure deep sea environment. The most efficient shape for withstanding intense pressure is a sphere. Therefore, to the extent practicable, the enclosure preferably has a gross geometry approaching that of a sphere.

A primary air shaft 14 extends from the interior of the enclosure 12 up to the atmosphere so that at any depth the enclosure is maintained at a pressure of approximately one atmosphere.

At least one intake valve 16 is disposed in the side of the enclosure 12 for admitting water into a conduit 18 which then directs water flow within the enclosure. See FIG. 4. Water flowing through the conduit 18 rotates a turbine 20. In the preferred embodiment, the turbines produce electricity, but could perform other work in alternative embodiments. In the illustrated embodiment, four intake valves 16 each associated with one of four turbines 20, are provided, but it will be readily understood that one or any plurality of intake valves and turbines could be used instead. A plurality of intake valves advantageously creates a more porous enclosure enabling the individual valve sizes to be reduced and allowing each individual valve, conduit or turbine to be serviced while continuing to operate the other intake elements.

As shown in FIGS. 1 and 2, the enclosure is partitioned into at least three compartments, a primary chamber 30, a secondary chamber 32, and a combined living space and control room 34. The primary chamber 30 is sealed off from the secondary chamber 32 by a partition 36. Each intake valve 16 and the conduit 18 and turbine 20 to which it is connected are disposed in or in the walls of the secondary chamber 32. However, water is discharged directly into the top of the primary chamber 30 from the end 38 of the conduit 18. It will be understood that the intake valve 16 could be located in one of the other spaces, such as the control room, or yet another partitioned space of the enclosure. In the illustrated embodiment, separating the enclosure to provide a secondary chamber provides a working space where the intake valves, conduits, and turbines can be maintained without having to disturb or interrupt the operations in the primary chamber. A secondary air shaft 40 extends from the secondary chamber to and is connected with the primary air shaft 14, allowing the air pressure in the secondary chamber to be maintained at approximately one atmosphere. Similarly, a third air shaft 42 extends from the living space 34 to the primary air shaft to provide a supply of air to the living space 34 at a pressure of approximately one atmosphere. The living space has an overall dome-shaped geometry reflecting the need for space constrained by a high pressure setting.

In a submerged state, the pressure differential between the surrounding sea water and the interior of the primary chamber will cause water to enter through the intake valves into the chamber. If the primary chamber were allowed to fill with water, the device would soon lose the ability to produce power. Accordingly, a pump is required to evacuate water from the primary chamber 30. As best seen in FIG. 2, a pump in the preferred embodiment includes a vertical column 52 attached at a lower end 54 to the bottom of the primary chamber 30 and extending upward through the top portion 56 of the enclosure 12. A piston shaft 58 disposed in a center bore 60 is attached at its upper end to a buoy 62 floating at the surface of the water. A top end 64 of the column 52 is located below the surface of the water such that water is admitted to a cylindrical space 66 (see FIGS. 3A and 3B) between the interior surface of the center bore 60 and the piston shaft 58 for lubrication of the shaft. The buoy 62 has a pronounced horizontally elongated shape such that it moves up and down in response to ocean swells but has minimal response to surface wave action. The piston shaft 58 therefore reciprocates in the center bore 60 in cooperation with the buoy 62 in a pumping action.

With reference to FIGS. 3A and 3B, the column 52 is fitted with a valve housing 70 having at least two inflow valves 72. Each inflow valve 72 includes a side opening 74 and a valve plate 76 affixed on the inside of each side opening 74 via a hinge 78 such that the valve plate is movable between an open position illustrated in FIG. 3A and a closed position shown in FIG. 3B. The valve housing 70 has a lateral dimension sufficient to permit the valve plates 76 to swing inwardly without interfering with travel of the piston shaft. In the open position, water that has collected in the primary chamber 30 of the enclosure is free to enter the valve housing 70. In the closed position (FIG. 3B) water is prevented from leaving the valve housing 70 to reenter the primary chamber 30. Thus, the inflow valves 72 act as check valves to allow water to enter the valve housing from the primary chamber, but prevent water from leaving the valve housing.

A discharge valve, indicated generally at 80, is secured to a bottom surface 82 of the bottom portion of the enclosure and covers an opening 84 in the bottom surface 82. The opening 84 is in communication with the center bore 60 and the valve housing 70. A plurality of stanchions 86 are affixed to and depend from the bottom surface 82 of the enclosure. A discharge valve plate 88 is provided with a cooperating number of holes 90 in which are disposed the stanchions 86 such that the discharge valve plate 88 may slide vertically over the stanchions between a closed position shown in FIG. 3A to an open position shown in FIG. 3B. Springs 92 are coiled around the stanchions 86 on the underside of the discharge valve plate 88 and are held in biased relation to the valve plate 88 on the stanchions by stanchion end caps 94. This arrangement permits the discharge valve plate 88 to move vertically away from opening 84 while restricting lateral movement. The discharge valve 80 acts as a check valve permitting water to be released from the center bore 60 and valve housing 70, but preventing water from the sea from entering the center bore and valve housing.

The combination of the inflow valves 72 and discharge valve 80 works in combination with the reciprocating action of the piston shaft 58 as a pump to evacuate water from the enclosure. Referring again to FIG. 3A, as the piston shaft 58 rises, as indicated by the upward arrow, the inflow valves open to draw water in from the enclosure to the valve housing. As shown in FIG. 3B, as the piston shaft 58 descends, indicated by the downward arrow, the pressure created in the valve housing closes the inflow valves 72 and forces open the discharge valve 80 to expel a quantity of water into the sea. Thus, the valve housing and center bore together act as a pump chamber which, together with the buoy, piston shaft and intake and discharge valves function as a pump to evacuate water from the enclosure into the surrounding body of water. It will be appreciated that since water in the enclosure is under only one atmosphere pressure, the amount of suction force needed to draw water into the valve housing is minimal. Therefore, water inflow into the valve housing is very efficient. On the other hand, the force necessary to open the discharge valve is at least as great as the pressure of the water surrounding the enclosure which can be potentially very high. In the preferred embodiment, the size of the valve housing is coordinated with the buoyancy of the buoy and the weight of the piston shaft to develop such force. It will be understood that if the device is submerged deeply under the ocean surface, the piston shaft will have an appropriate length and consequently its weight may be quite substantial. The weight of the shaft is calibrated to be sufficient on a down stroke to overcome the exterior water pressure on the discharge valve. A distinct advantage of the invention is that, as the enclosure is submerged more deeply, the weight of the piston shaft increases corresponding to its increased length such that the increased weight becomes available to counteract the increased water pressure acting on the discharge valve.

In addition to the pumping system provided to remove water from the enclosure, each of the intake valves 16 is controllable to limit the incoming flow of water into the enclosure. It is recognized that there will be fluctuations in sea pressure and in the frequency and amplitude of ocean swells and that some regulation of the amount of water admitted into the enclosure through the intake valve will have to be imposed to avoid filling the enclosure with water faster than the pump can remove it. However, the external power needed to make such adjustments is minor in comparison to the power produced by the device.

Continuous removal of the same amount of water from the enclosure at the same rate that it is allowed to flow into the enclosure ensures that an air space 96 will be maintained in the top of the primary chamber above the surface of the water collected therein. See FIG. 2. Relatively minor fluctuations in pressure caused by evacuation of water from the enclosure are compensated for by intake and release of air through the air shaft as the air space in the primary chamber constantly seeks equilibrium with the atmosphere at surface level. Consequently, the air space 96 in the primary chamber remains constantly at approximately one atmosphere despite the pumping action of the piston shaft. Since the air space 96 is continually maintained at approximately one atmosphere, water will continually flow from the surrounding sea into the primary chamber with the distinct resulting advantage that the turbines can be operated continuously, rather than intermittently as in the prior art, and at a steady rate. A submersible power plant is in this manner capable of highly efficient production of power.

In addition to or instead of the air shafts 14, 40, and 42, alternate means of providing and maintaining air spaces at one atmosphere pressure include pressurized air tanks and air tubes running to the surface.

A preferred site for installation of the submerged power plant will provide an appropriate depth of water and an ocean floor below within reach at a selected depth of a plurality of supports 100 attached to the enclosure. Taking into account overall buoyancy and weight, the device may be submerged to the desired depth by employing ballast technology well known to those having skill in the art. Alternatively, or in addition, the power plant can be anchored to the ocean floor with weights, secured to permanently installed piers, or attached to other stable devices such an ocean platform. Preferably, however, the amount of water retained on average at any one time in the enclosure as an inherent part of the power producing function of the device will be calibrated to include the ballast needed to maintain the device at the selected depth.

In the preferred embodiment, four supports 100 are provided for stabilization and support of the device. As shown in FIG. 2, each support includes a vertical bore 102 and a leg 104 retractably disposed within the bore 102 and downwardly extendable towards the ocean floor. Each leg 104 has attached to its lower end a footing 106 for resting on the ocean floor, and is extendable to a selected length independently from the other legs so that the power plant may be leveled on an uneven ocean floor. It will be appreciated that a minimum of three legs will fulfill this leveling function, but that a plurality of legs greater than four could also be used.

Referring back to FIGS. 1 and 2, a plurality of posts 108 extend upwardly from the enclosure 12 forming a superstructure. In the upper portion of the superstructure, a plurality of arms 110 extend inwardly from the upper parts of the posts to form a cross-brace 112 at the center of which is a collar 114 for lateral support of the piston shaft 58.

Installation of the device entails towing the power plant to a suitable location. Since it is known that the pressure of sea water increases by approximately one atmosphere for every 33 feet of depth, causing the enclosure to descent to a selected depth will surround it with water at a known pressure. Thereafter, the device is stabilized on its extendable legs.

There have thus been described and illustrated certain preferred embodiments of a submersible power plant according to the invention. Although the present invention has been described and illustrated in detail, it is clearly understood that the same is by way of illustration and example only and is not to be taken by way of limitation, the spirit and scope of the present invention being limited only by the terms of the appended claims and their legal equivalents.

I claim:

1. A submersible power plant comprising:
   a submersible enclosure for submersion in a surrounding body of water to a depth at which the water is under a selected high pressure,
   an air shaft for maintaining said enclosure at a constant pressure of approximately one atmosphere,
   at least one intake valve for admitting water at said selected high pressure from said surrounding body of water into said enclosure,
   at least one turbine driven by water flowing through said intake valve into said enclosure,
   at least one pump for evacuating water from said enclosure, said pump having a pump chamber, a piston shaft, a buoy, an inflow valve, and a discharge valve,
   said piston shaft slidingly disposed in said pump chamber,
   said buoy for floating at the surface of said body of water, said buoy experiencing vertical movement responsive to surface swells in the body of water, said buoy affixed to said piston shaft such that said piston shaft reciprocates in said pump chamber in cooperation with the vertical movement of said buoy,
   said inflow valve for admitting water from said enclosure into said pump chamber but checking water from flowing out of said pump chamber, and
   said discharge valve permitting discharge of water into the surrounding body of water from said pump chamber but checking water from flowing into said pump chamber,
   upward motion of said piston shaft drawing water from said enclosure into said pump chamber through said inflow valve, and downward motion of said piston shaft forcing water through said discharge valve out of said pump chamber into the surrounding body of water, said at least one pump calibrated to evacuate from said enclosure approximately the same volume of water admitted into said enclosure by said intake valve.

2. The submersible power plant of claim 1 wherein:
   said enclosure has a grossly spherical geometry.

3. The submersible power plant of claim 1 wherein:
   said air shaft is in communication with the atmosphere.

4. The submersible power plant of claim 3 further comprising:
   said enclosure having an air space, said air shaft in communication with said air space for maintaining said air space at an air pressure of approximately one atmosphere, said at least one intake valve for directing water admitted through said valve into said air space.

5. The submersible power plant of claim 3 further comprising:
   said enclosure having an air space, said air shaft in communication with said air space for maintaining said air space at an air pressure of approximately one atmosphere,
   at least one conduit in communication with said at least one intake valve for carrying water admitted through said at least one intake valve, said conduit having a terminal end opening into said air space.

6. The submersible power plant of claim 1 further comprising:

at least one support for stabilizing said enclosure on an earth surface under the body of water.

7. The submersible power plant of claim 6 wherein:
said at least one support comprises four supports.

8. The submersible power plant of claim 6 wherein:
each said support is attached to said submersible enclosure, each said support having a substantially vertical bore and a leg in sliding disposition in said bore, said leg downwardly and retractably extendable to a selected distance from said bore, and said leg having a footing for resting on an earth surface under the body of water.

9. The submersible power plant of claim 1 wherein:
said at least one intake valve comprises a plurality of intake valves.

10. The submersible power plant of claim 1 wherein:
said at least one turbine comprises a plurality of turbines.

11. The submersible power plant of claim 1 wherein:
on said downward motion said piston shaft has a weight calibrated to overcome exterior water pressure from said surrounding body of water bearing on said discharge valve.

12. The submersible power plant of claim 1 further comprising:
said center bore having an inner diameter and said piston shaft having an outer diameter slightly smaller than said inner diameter, such that said piston shaft substantially occupies the horizontal dimension of, but moves freely vertically in, said center bore.

13. A submersible power plant comprising:
a submersible enclosure for submersion in a surrounding body of water to a depth at which the water is under a selected high pressure, said enclosure having a bottom portion and a top portion, and said bottom portion having at least one discharge valve,
an air shaft extending from said enclosure to the atmosphere for maintaining said enclosure at a constant pressure of approximately one atmosphere,
at least one intake valve for admitting water at said selected high pressure from said surrounding body of water into said enclosure,
at least one turbine driven by water flowing through said intake valve into said enclosure, and
a pump for evacuating water from said enclosure, said pump including
a substantially vertical column affixed to and extending upwardly from said bottom portion through said top portion, said column having a top opening above said top portion and a center bore extending from said bottom portion of said enclosure to said top opening,
a piston shaft slidingly disposed in said center bore, said piston shaft having a top portion, and
a buoy for floating at the surface of said body of water, said buoy experiencing vertical movement responsive to surface swells in said body of water, said buoy affixed to said top portion of said piston shaft such that said piston shaft reciprocates in said center bore in cooperation with said vertical movement of said buoy,
said column having at least one inflow valve in proximate disposition to said bottom portion of said enclosure for admitting water from said enclosure into said center bore, said inflow valve checking water flow out of said center bore,
said discharge valve being in communication with said center bore, said discharge valve permitting discharge of water from said center bore but checking water flow into said center bore,
such that upward motion of said piston shaft draws water from said enclosure into said center bore through said inflow valve and a downward stroke of said piston shaft forces water through said discharge valve out of said enclosure, said pump calibrated to evacuate from said enclosure approximately the same volume of water admitted into said enclosure by said intake valve.

14. The submersible power plant of claim 13 further comprising:
means for supporting said piston shaft between said buoy and said top opening.

15. The submersible power plant of claim 13 further comprising:
said bottom portion having a bottom surface and an opening in communication with said center bore, and
said discharge valve having a valve plate disposed against said bottom surface of said bottom plate, said valve plate covering said opening, and said discharge valve having means for holding said valve plate in biased disposition against said bottom surface, such that a downward stroke of said piston shaft causes water in said center bore to force said valve plate away from said bottom surface.

16. The submersible power plant of claim 15 wherein:
said valve plate has a lower face, and
said means for holding includes a plurality of springs in biased disposition against said lower face of said valve plate.

17. The submersible power plant of claim 13 wherein:
said column has an interior surface and at least one side opening,
said inflow valve has a hinge affixed to said interior surface of said column and a valve plate depending from said hinge, said valve plate covering said side opening, such that water flowing into said column from said enclosure swings said valve plate inwards and increased water pressure in said column forces said valve plate against said side opening.

18. The submersible power plant of claim 13 wherein:
said bottom portion has a bottom surface and an opening in communication with said center bore, and
said discharge valve includes
a valve plate disposed against said bottom surface of said bottom portion, said valve plate having a lower face,
a plurality of springs in biased disposition against said lower face of said valve plate, and
means for urging said plurality of springs against said lower face of said valve plate.

19. The submersible power plant of claim 18 further comprising:
a plurality of stanchions depending from said bottom surface of said bottom plate, and said valve plate having a plurality of holes, said plurality of stanchions in sliding disposition in said plurality of holes, said plurality of springs coiled around said plurality of stanchions.

20. The submersible power plant of claim 13 further comprising:
said column having at least one laterally extending recess, each said inflow valve housed in one of said recesses.

21. The submersible power plant of claim 13 further comprising:

an upwardly extending superstructure attached to said enclosure, said superstructure having an upper portion surrounding said piston shaft such that said superstructure provides lateral support for said piston shaft.

22. The submersible power plant of claim 21 further comprising:
said superstructure including at least one upwardly extending post disposed in general parallel alignment with said column, said post having a base portion and an upper part, said base portion attached to said enclosure, a collar surrounding said piston shaft between said enclosure and said buoy, and an arm extending between said upper part of said at least one post and said collar.

23. The submersible power plant of claim 22 wherein:
said at least one post comprises at least four posts.

24. A submersible power plant comprising:
a submersible enclosure for submersion in a surrounding body of water to a depth at which the water is under a selected high pressure, said enclosure partitioned into at least two chambers including a primary chamber and a secondary chamber,
means for maintaining said enclosure at a constant pressure of approximately one atmosphere,
at least one intake valve for admitting water at said selected high pressure from said surrounding body of water into said enclosure, at least one conduit for carrying water admitted through said at least one intake valve, said conduit in communication with said intake valve, said conduit having a terminal end disposed in said primary chamber,
at least one turbine disposed in said secondary chamber, said turbine in communication with said conduit intermediate said intake valve and said terminal end, said turbine driven by water flowing through said intake valve into said enclosure, and
a pump for evacuating water from said enclosure, said pump calibrated to evacuate from said primary chamber approximately the same volume of water admitted into said enclosure by said intake valve.

25. The submersible power plant of claim 24 wherein:
said means for maintaining an atmosphere includes a secondary air shaft in communication with the atmosphere.

26. The submersible power plant of claim 24 wherein:
said submersible enclosure includes a habitable space bounded by an upwardly extending elongated dome, and
means for maintaining an atmosphere in said habitable space at a pressure of approximately one atmosphere.

27. A submersible power plant comprising:
a submersible enclosure for submersion in a surrounding body of water at a depth at which the water is under a selected high pressure, said enclosure having a bottom portion and a top portion,
an air shaft in communication with the atmosphere, said air shaft opening into said enclosure for maintaining said enclosure at a constant pressure of approximately one atmosphere,
at least one intake valve for admitting water at said selected high pressure from the surrounding body of water into said enclosure,
at least one turbine driven by water flowing through said intake valve into said enclosure,
said bottom portion having at least one discharge valve,
a substantially vertical column affixed to and extending upwardly from said bottom portion through said top portion, said column having a top opening above said top portion of said enclosure and a center bore extending from said bottom portion of said enclosure to said top opening,
a piston shaft slidingly disposed in said center bore, said piston shaft having an upper end, and
a buoy for floating at the surface of the body of water, said buoy experiencing vertical movement responsive to surface swells in the body of water, said buoy affixed to said upper end of said piston shaft such that said piston shaft reciprocates in said center bore in cooperation with said vertical movement of said buoy,
said column having at least one inflow valve in proximate disposition to said bottom portion of said enclosure for admitting water from said enclosure into said center bore, said inflow valve checking water from flowing out of said center bore,
said discharge valve being in communication with said center bore, said discharge valve permitting discharge of water from said center bore but checking water from flowing into said center bore,
such that upward motion of said piston shaft draws water from said enclosure into said center bore through said inflow valve and a downward stroke of said piston shaft forces water through said discharge valve out of said enclosure.

28. A submersible power plant comprising:
a submersible enclosure for submersion in a surrounding body of water at a depth at which the water is under a selected high pressure, said enclosure having a bottom portion, a top portion, a primary chamber, and a secondary chamber,
at least one intake valve for admitting water at said selected high pressure from the surrounding body of water into said enclosure,
at least one conduit for carrying water admitted through said at least one intake valve, said intake valve in communication with said conduit, said conduit having a terminal end disposed in said primary chamber,
at least one turbine in communication with said conduit intermediate said intake valve and said terminal end, said turbine disposed in said secondary chamber, said turbine driven by water flowing through said conduit into said enclosure,
a primary air shaft in communication with the atmosphere, said primary air shaft opening into said primary chamber for maintaining said primary chamber at a constant pressure of approximately one atmosphere,
a secondary air shaft in communication with the atmosphere, said secondary air shaft opening into said secondary chamber for maintaining said secondary chamber at a constant pressure of approximately one atmosphere,
said bottom portion having at least one discharge valve,
a substantially vertical column affixed to and extending upwardly from said bottom portion through said top portion, said column having a top opening above said top portion of said enclosure and a center bore extending from said bottom portion of said enclosure to said top opening,
a piston shaft slidingly disposed in said center bore, said piston shaft having an upper end, and
a buoy for floating at the surface of the body of water, said buoy experiencing vertical movement responsive to surface swells in the body of water, said buoy affixed to said upper end of said piston shaft such that said piston shaft reciprocates in said center bore in cooperation with said vertical movement of said buoy, said column having at least one inflow valve in proximate disposition to said bottom portion of said enclosure for admitting water from said enclosure into said center bore, said inflow valve checking water flow out of said center bore, said discharge valve being in communication with said center bore, said discharge valve permitting discharge of water from said center bore but checking water flow into said center bore, such that upward motion of said piston shaft draws water from said primary chamber into said center bore through said inflow valve and a downward stroke of said piston shaft forces water through said discharge valve out of said enclosure.

29. A submersible power plant comprising:

a submersible enclosure for submersion in a surrounding body of water at a depth at which the water is under a selected high pressure, said enclosure having a bottom portion, a top portion, a primary chamber, and a secondary chamber, at least one intake valve for admitting water at said selected high pressure from the surrounding body of water into said enclosure, at least one conduit for carrying water admitted through said at least one intake valve, said intake valve in communication with said conduit, said conduit having a terminal end disposed in said primary chamber, at least one turbine in communication with said conduit intermediate said intake valve and said terminal end, said turbine disposed in said secondary chamber, said turbine driven by water flowing through said conduit into said enclosure, a primary air shaft in communication with the atmosphere, said primary air shaft opening into said primary chamber for maintaining said primary chamber at a constant pressure of approximately one atmosphere, a secondary air shaft in communication with the atmosphere, said secondary air shaft opening into said secondary chamber for maintaining said secondary chamber at a constant pressure of approximately one atmosphere, said bottom portion having at least one discharge valve, a substantially vertical column affixed to and extending upwardly from said bottom portion through said top portion, said column having a top opening above said top portion of said enclosure and a center bore extending from said bottom portion of said enclosure to said top opening, a piston shaft slidingly disposed in said center bore, said piston shaft having an upper end, a buoy for floating at the surface of the body of water, said buoy experiencing vertical movement responsive to surface swells in the body of water, said buoy affixed to said upper end of said piston shaft such that said piston shaft reciprocates in said center bore in cooperation with said vertical movement of said buoy, a plurality of upwardly extending posts disposed generally in parallel alignment with said column, each post having a base portion and an upper part, said base portion attached to said enclosure, a collar surrounding said piston shaft between said enclosure and said buoy, and a plurality of arms, each arm extending between said upper part of one of said plurality of posts and said collar, such that said collar provides lateral support above said enclosure for said piston shaft, said column having at least one inflow valve in proximate disposition to said bottom portion of said enclosure for admitting water from said enclosure into said center bore, said inflow valve checking water from flowing out of said center bore, said discharge valve being in communication with said center bore, said discharge valve permitting discharge of water from said center bore but checking water from flowing into said center bore, such that upward motion of said piston shaft draws water from said primary chamber into said center bore through said inflow valve and a downward stroke of said piston shaft forces water through said discharge valve out of said enclosure, and a plurality of supports attached to said enclosure, each support having a substantially vertical bore and a leg in sliding disposition in said bore, said leg downwardly and retractably extendable to a selected distance from said bore, said leg having a footing for resting on an earth surface under the body of water.

30. The submersible power plant of claim 29 further comprising:

said primary chamber having an air space, said primary air shaft in communication with said air space for maintaining said air space at an air pressure of approximately one atmosphere, and said terminal end of said conduit opening into said air space.

* * * * *